United States Patent
He (10) Patent No.: US 8,857,423 B2
(45) Date of Patent: Oct. 14, 2014

(54) JET TYPE GAS COOKER

(76) Inventor: Meishun He, Hubei (CN)

(\*) Notice: Subject to any disclaimer, the term of this patent is extended or adjusted under 35 U.S.C. 154(b) by 1032 days.

(21) Appl. No.: 12/735,453

(22) PCT Filed: Jul. 8, 2009

(86) PCT No.: PCT/CN2009/072686
§ 371 (c)(1),
(2), (4) Date: Jul. 15, 2010

(87) PCT Pub. No.: WO2010/020140
PCT Pub. Date: Feb. 25, 2010

(65) Prior Publication Data
US 2010/0282238 A1 Nov. 11, 2010

(30) Foreign Application Priority Data
Aug. 18, 2008 (CN) .................... 2008 2 0146485 U (51) Int. Cl.
*F24C 3/00* (2006.01)
*F24C 3/08* (2006.01)

(52) U.S. Cl.
CPC ..................... *F24C 3/085* (2013.01)
USPC .............................. 126/253; 126/39 E; 431/9

(58) Field of Classification Search
USPC ................. 126/19.5, 249, 251, 253, 39 E, 40; 431/8, 9, 182, 183, 354
See application file for complete search history.

(56) References Cited

U.S. PATENT DOCUMENTS

| | | | | |
|---|---|---|---|---|
| 221,688 A * | 11/1879 | McDonald et al. | ............. | 126/40 |
| 643,466 A * | 2/1900 | Campbell | ..................... | 431/328 |
| 3,720,496 A * | 3/1973 | Briggs | ........................... | 431/353 |
| 4,541,407 A * | 9/1985 | Sommers et al. | ........... | 126/39 E |
| 4,960,378 A * | 10/1990 | Jannemann et al. | .......... | 431/114 |
| 5,066,219 A * | 11/1991 | Anzawa et al. | ................. | 431/10 |
| 5,447,427 A * | 9/1995 | Suzuki | .............................. | 431/7 |
| 5,879,148 A * | 3/1999 | Cheng et al. | ...................... | 431/9 |
| 7,591,648 B2 * | 9/2009 | Mosiewicz | .................... | 431/351 |
| 8,122,875 B2 * | 2/2012 | Kim et al. | ................. | 126/92 AC |
| 2007/0054228 A1* | 3/2007 | Fogliani et al. | ............... | 431/354 |
| 2009/0017407 A1* | 1/2009 | Fogliani et al. | ............... | 431/354 |
| 2010/0330514 A1* | 12/2010 | Lam | ............................... | 431/12 |

\* cited by examiner

*Primary Examiner* — Shephen M Hepperle
*Assistant Examiner* — R. K. Arundale
(74) *Attorney, Agent, or Firm* — Raymond Y. Chan; David and Raymond Patent Firm (57) ABSTRACT

A jet type gas cooker includes a burner head having a mixing chamber therewithin, wherein a grid element is disposed at a bottom side of the mixing chamber of the burner head; a flame controller seated on top of the burner head; a fuel gas pipe extended to the bottom side of the burner head for ejecting fuel gas into the mixing chamber; and a gas flow disturbing mixer supported within the mixing chamber of the burner head for mixing the fuel gas with air to form a combustion gas within the mixing chamber.

10 Claims, 8 Drawing Sheets

JET TYPE GAS COOKER

BACKGROUND OF THE PRESENT INVENTION

1. Field of Invention

The present invention relates to a jet type gas cooker, and more particularly to a burner of the jet type gas cooker.

2. Description of Related Arts

Gas stove or gas cooking range is common household appliance or equipment commonly seen in most of the modern family. There is variety of types of fuel gas stoves, such as the gas stoves using liquid petroleum fuel, coal, natural gas, or biogas as the combustible gases for generating the heat energy.

The traditional gas stoves basically comprises a cast iron burner that the gas is jetted thereinto, and a burner head arranged for the fuel gas or fuel gas being supplied to the burner head, so that the fuel gas is burning on the burner head for transferring the heat to the bottom of cooking pot or cooking pan, so as to heat up the food therein. However, this type of gas stove has two main concerns. First, the fuel gas burning on the burner head is only relied on the oxygen in the ambient air for combusting the gas without premixing with oxygen before starting burning, so that the fuel gas is unable to be fully burned. Thereby, the incompletely burned fuel gas causes the waste of energy and the excess amount of hazard gas emission thereof. Secondly, heat transferring efficiency of the gas stove depends on the distance between the burning flame and the bottom heating portion of the cooking pan, so that the heat exchanging rate therebetween is low.

The china patent 200720120452.9 has published a jet gas stove, wherein the fuel gas is arranged to premix with air in a hollow mixing pipe before the fuel gas starting burning. One advantage of this type of gas stove is that the gas stove has relatively higher fuel gas utilization rate and relatively lower amount of hazard gas emission. Another advantage is that a flame control lid is further provided on the top of the burner head, so that the burning flame of the fuel gas is able to burn on the flame control lid to directly contact with the bottom portion of the cooking pan, so as to reduce the heat energy lost during the heat transferring from the flame to the cooking pan. Therefore, it slightly enhances the heat exchanging rate between the stove and the cooking pan or any other to cooking wares. However, the fuel gas is arranged to naturally mix with the air in the hollow mixing pipe. Therefore, the fuel gas is still unable to well mix with the air to fully burn the combustion gas. On the other hand, no matter the bottled fuel gas or the pipeline conveyed combustion gas, the pressure of the gas nozzle to jet the fuel gas therefrom is low. Therefore, the performance of the flame of the combustion gas, which usually applies the jet pressure of the gas nozzle for burning on the flame control lid, can not be optimized or significantly enhanced.

SUMMARY OF THE PRESENT INVENTION

The invention is advantageous in that it provides a jet type gas cooker, which is able to well premix the fuel gas with the air, reduce the emission amount of hazard gas, and to enhance the heat exchanging rate between the flame of the fuel gas and the cooking wares.

Additional advantages and features of the invention will become apparent from the description which follows, and may be realized by means of the instrumentalities and combinations particular point out in the appended claims.

According to the present invention, the foregoing and other objects and advantages are attained by providing a jet type gas cooker, which comprises a burner head having a mixing chamber therewithin, wherein a grid element is disposed at a bottom side of the mixing chamber of the burner head; a flame controller seated on top of the burner head; a fuel gas pipe extended to the bottom side of the burner head for ejecting fuel gas into the mixing chamber; and a gas flow disturbing mixer supported within the mixing chamber of the burner head for mixing the fuel gas with air to form a combustion gas within the mixing chamber.

In the preferred embodiment of the present invention, the mixing chamber of the burner head is cylindrical shape, wherein the gas flow disturbing mixer has a corresponding cylindrical shape for fittedly disposing within the mixing chamber. The gas flow disturbing mixer has a first mixer unit and a second mixer unit, wherein the first and second mixer units both have cylindrical shaped casings that the casing of the first mixer unit is spacedly encircled within the casing of the second mixer unit. The air-fuel mixer further comprises a plurality of slanted grooves inclinedly extended at outer sides of the casings of the first and second mixer units from a top side to a bottom side thereof in a spiral manner, and a plurality of ejecting holes radially formed at the casings of the first and second mixer units, wherein the ejecting holes are through holes and are formed at the casings of the first and second mixer units to align with the slanted grooves thereat.

A depressurizing split-flow arrangement is further provided at the bottom side of the burner head.

According to the preferred embodiment of the present invention, an air blow housing is provided at the bottom side of the burner head, wherein the fuel gas pipe is extended through an air chamber of the air blow housing to the bottom side of the burner head, wherein an upper side of the air blow housing is sealed with the bottom side of the burner head, wherein the air blow housing further has at least an air inlet formed at a surrounding wall of the air blow housing for operatively coupling with an air blower through the air inlet to blow an air flow into the air chamber of the air blow housing.

Accordingly, a partition element, having a planar structure with a plurality of meshes provided thereon, is supported within the mixing chamber of the burner head to define an upper first mixing room and a lower second mixing room, wherein the gas flow disturbing mixer is supported at the first mixing room.

Accordingly, an air blow housing is integrally formed at the bottom side of the burner head, wherein the fuel gas pipe is extended through an air chamber of the air blow housing at the bottom side of the burner head, wherein an upper side of the air blow housing is sealed with the bottom side of the burner head, wherein the air blow housing further has at least an air inlet formed at a surrounding wall of the air blow housing for operatively coupling with an air blower through the air inlet to blow an air flow into the air chamber of the air blow housing.

Accordingly, a partition element, having a plurality of meshes provided thereon, is supported within the mixing chamber of the burner head to define an upper first mixing room and a lower second mixing room, wherein the gas flow disturbing mixer is supported at the first mixing room, wherein the air blow housing is located adjacent to the burner head, wherein the air blow housing further comprises a communication channel extended between the air blow housing and the burner head to communicate the second mixing room of the burner head with the air chamber of the air blow housing so as to guide an air flow from the air chamber of the air blow housing to the second mixing room of the burner head through the communication channel, wherein the air blow housing further has at least an air inlet formed at a surrounding wall of the air blow housing for operatively coupling with an air blower through the air inlet to blow the air flow into the air chamber of the air blow housing.

Therefore, the jet type gas cooker of the present invention at least has the following advantages. The gas flow disturbing mixer disposed within the mixing chamber of the burner head to enforcedly well premix the air and the fuel gas in a turbulent manner. Therefore, the well mixed air and fuel gas provides adequate oxygen for fully burning the combustion gas, so as to save the energy of the fuel of the fuel gas and to minimize the emission of hazard gases. The air blow housing is provided at the bottom of the hollow mixing pipe of the burner head for guiding the air flow into the mixing chamber of the burner head, so that the supply of oxygen is increased, so as to enhance the mixing effect between the air and the fuel gas. Meanwhile, the air flow from the air blow housing will substantially increase the pressure of the mixed fuel gas with air within the mixing chamber of the burner head to ensure the mixed fuel gas with air being upwardly ejected at the flame controller. Therefore the distance between the flame of the burning fuel gas at the flame controller and the bottom of the cooking utensil or appliance is substantially minimized to enhance the heat transferring efficiency from the flame to the cooking utensils. The supply of oxygen for burning fuel gas is also increased for relatively more fully burning the combustion gas as the mixed fuel gas with air. The partition element is disposed within the mixing chamber of the burner head. Therefore, the fuel gas is firstly mixing with the air in the first mixing room, and then secondly mixing with the air in the second mixing room via the gas flow disturbing mixer to further enforce the mixing effect between the air and the fuel gas, so that the fuel gas is able to be highly mixed with the air, so as to fully burn the fuel gas to maximize the utilizing energy of the combustion gas.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following will disclose the detailed description with the preferred embodiments and the accompanying drawings.

Figure 1:
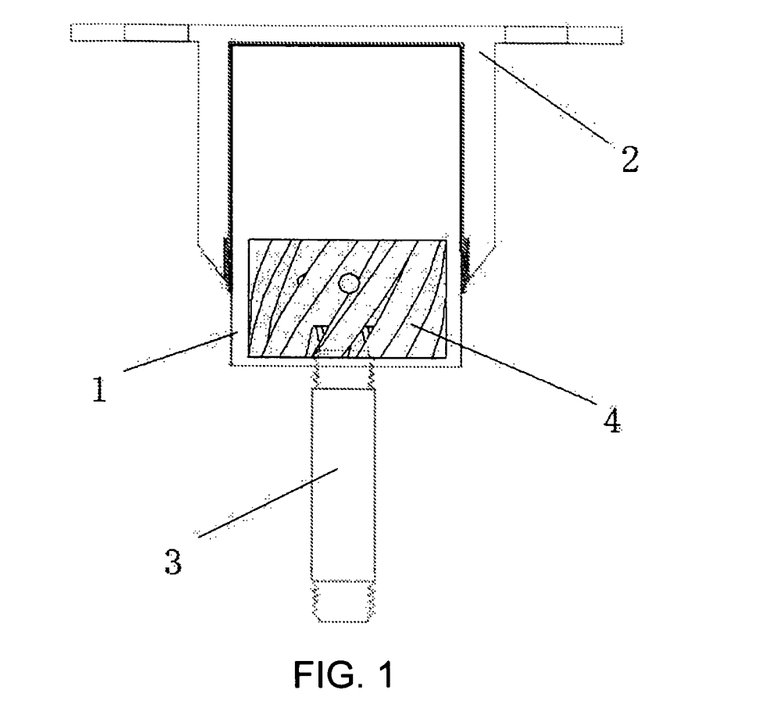
FIG. 1 is a perspective view of a jet type gas cooker according to a preferred embodiment of the present invention.
Figure 2:
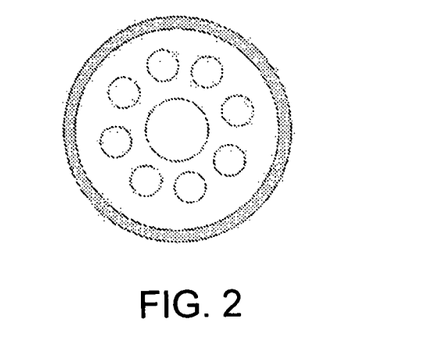
FIG. 2 is a perspective view of a grid element of a burner head of the jet type gas cooker according to the above preferred embodiment of the present invention.
Figure 3:
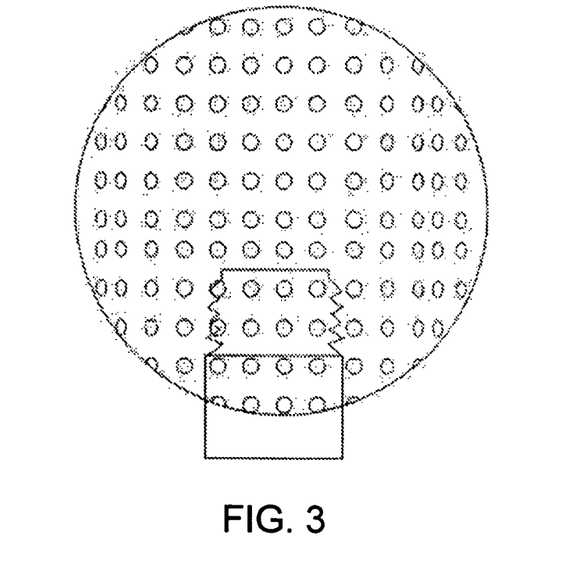
FIGS. 3 to 5 illustrate variety types of a gas flow disturbing mixer of the jet type gas cooker according to the above preferred embodiment of the present invention.
Figure 4:
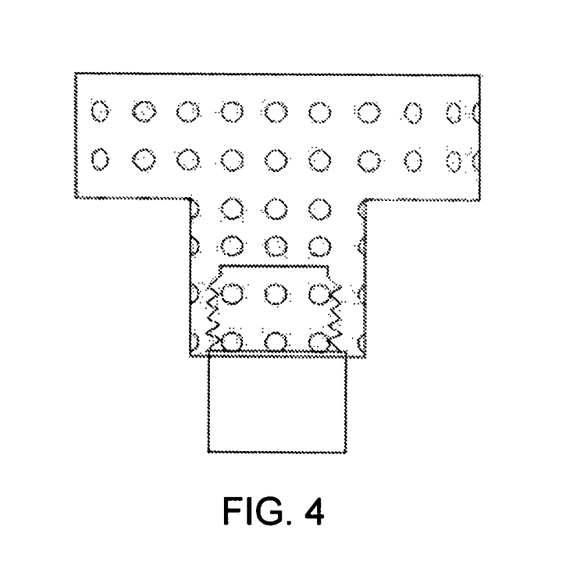
Figure 5:
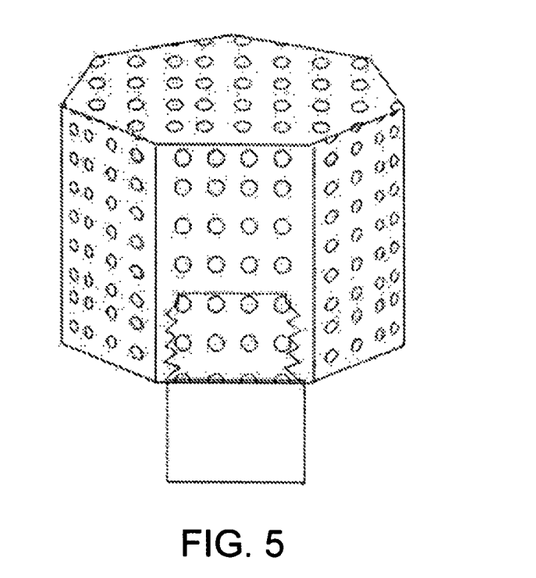

Referring to FIG. 1 of the drawings, a jet type gas cooker according to a preferred embodiment of the present invention is illustrated, wherein the jet type gas cooker comprises a burner head 1 having a mixing chamber for premixing fuel gas with air being the fuel gas is initially ignited. The gas cooker further comprises a grid element 11 disposed at the bottom side of the mixing chamber of the burner head 1, wherein the grid element 11 has a plurality of mesh holes, as shown in FIG. 2, for guiding the air entering into the mixing chamber of the burner head 1. The gas cooker further comprises a flame controller 2 as a cover seated on top of the burner head 1, wherein the flame controller 2 has a plurality of communication holes for communicating with the mixing chamber of the burner head 1. It is appreciated that the flame controller 2 can be integrally formed the burner head 1 to form a one piece integrated member by a molding tool and process. Alternatively, the flame controller 2 and the burner head 1 can be two individual components and can be detachably coupled with each other via threaded engaging structure so as to retain the flame controller 2 on the burner head 1. The gas cooker further comprises a fuel gas pipe 3 extended to the bottom side of the burner head 1 and a gas flow disturbing mixer 4 supported within the mixing chamber of the burner head 1. Accordingly, the gas flow disturbing mixer 4 is adapted for well-premixing the air with the fuel gas to form a combustion gas before the fuel gas ignited to burn within the mixing chamber. As shown in FIGS. 3 and 5, the gas flow disturbing mixer 4 can have variety of shapes. Generally, the gas flow disturbing mixer 4 has a surrounding wall defining a hollow cavity therewithin for mixing the fuel gas jetted from the fuel gas pipe 3 with the air, and a plurality of gas-fuel through holes spacedly formed at the surrounding wall for releasing the mixed air with fuel gas from the hollow cavity to the mixing chamber. Thereby, the air is turbulent within the hollow cavity of the gas flow disturbing mixer 4 to mix with the fuel gas so as to effectively enhance the mixing effect therebetween. The well mixed air and fuel gas provides adequate oxygen for fully burning the combustion gas, so as to save the energy of the fuel of the fuel gas and to minimize the emission of hazard gases, which is formed because of the inadequate oxygen to cause an incomplete reaction between the oxygen and the combustion gas.

Figure 6:
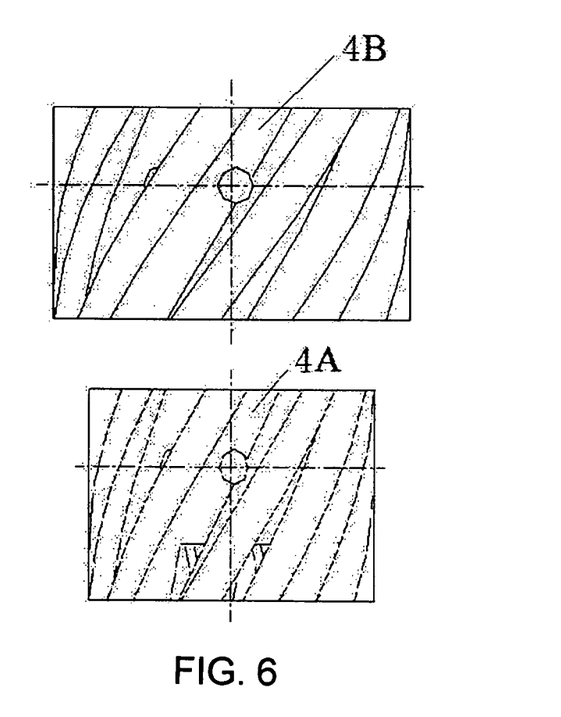
FIG. 6 is an exploded view of a gas flow disturbing mixer of the jet type gas cooker according to the above preferred embodiment of the present invention.
Figure 7:
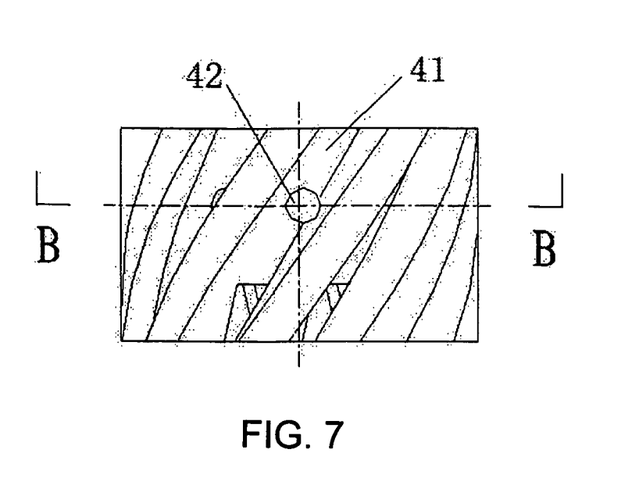
FIG. 7 is another perspective view of a gas flow disturbing mixer of the jet type gas cooker according to the above preferred embodiment of the present invention.
Figure 8:
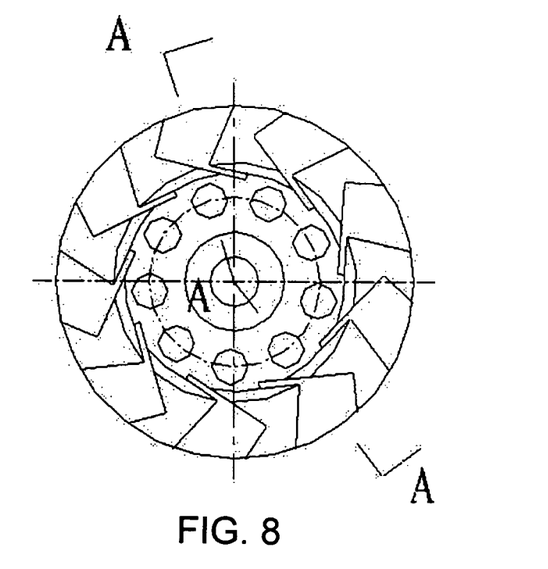
FIG. 8 is a bottom view of FIG. 6.
Figure 9:
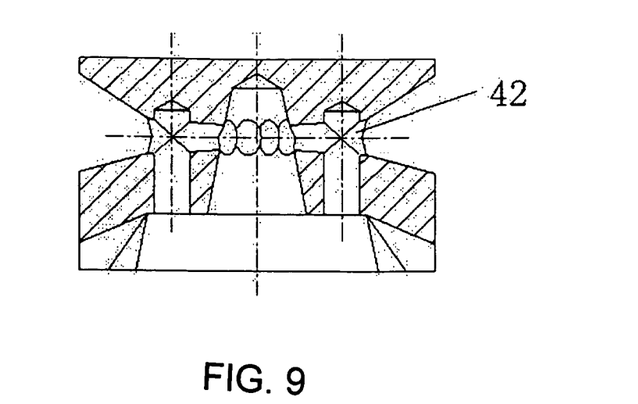
FIG. 9 is a A-A sectional view of FIG. 7.
Figure 10:
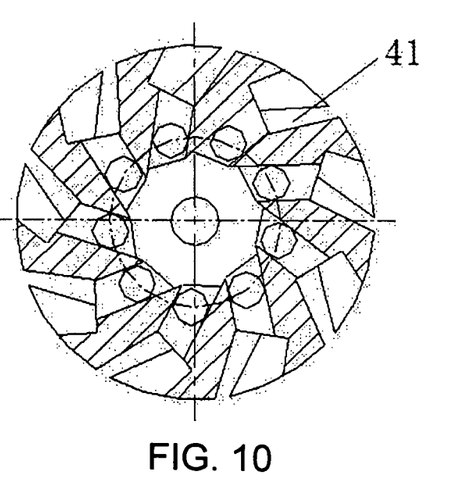
FIG. 10 is a B-B sectional view of FIG. 6.

According to the preferred embodiment of the present invention, the mixing chamber of the burner head 1 is cylindrical shape, wherein the gas flow disturbing mixer 4 preferably has a corresponding cover or cap like cylindrical shape for fittedly disposing within the mixing chamber. According to the preferred embodiment, the size and shape of the gas flow disturbing mixer 4 can be configured to match with the size and shape of the mixing chamber such that the gas flow disturbing mixer 4 can be fitted into the mixing chamber. As shown in FIG. 6, the gas flow disturbing mixer 4 has a first mixer unit 4A and a second mixer unit 4B, wherein the first and second mixer units 4A, 4B both preferably have cylindrical cap shaped casings that the casing of the first mixer unit 4A is encircled within a casing of the second mixer unit 4B to form the cap like cylindrical shaped gas flow disturbing mixer 4. As further shown in FIGS. 7, 8, 9, and 10 of the drawings, the air-fuel mixer 4 further comprises a plurality of slanted grooves 41 inclinedly extended at the outer sides of the casings of the first and second mixer units 4A, 4B from a top side to a bottom side thereof in a spiral manner, and a plurality of ejecting holes 42 radially formed at the casings of the first and second mixer units 4A, 4B, wherein the ejecting holes 42 are through holes and are formed at the casings of the first and second mixer units 4B to align with the slanted grooves 41 thereat. In addition, the first mixer unit 4A has an interior cavity for mixing the fuel gas with the air. When the fuel gas pipe 3 injects the fuel gas into the interior cavity of the first mixer unit 4A, the fuel gas is turbulent therewithin to initially mix with the air. Due to the pressure of the fuel gas, the mixed fuel gas with air is guided to radially and outwardly eject from the interior cavity of the first mixer unit 4A through the ejecting holes 42 thereat towards the second mixer unit 4B. Since the openings of the ejecting holes 42 are formed at the slanted grooves 41, the mixed fuel gas with air is guided to upwardly flow along the slanted grooves 41 at the casing of the first mixer unit 4A in a spiral manner. Since the casing of the first mixer unit 4A is coaxially and spacedly disposed within the casing of the second mixer unit 4B, the mixed fuel gas with air from the first mixer unit 4A is secondly well-mixed within a casing space between the casings of the first and second mixer units 4A, 4B. Likewise, due to the pressure of the mixed fuel gas with air within the casing space, the mixed fuel gas is then guided to radially and outwardly eject from the casing space to the outer side of the casing of the second mixer unit 4B through the ejecting holes 42 thereat. Since the openings of the ejecting holes 42 are also formed at the slanted grooves 41, the mixed fuel gas with air is guided to upwardly flow along the slanted grooves 41 at the casing of the second mixer unit 4B in a spiral manner. Accordingly, the first and second mixer units 4A, 4B of the gas flow disturbing mixer 4 are disposed within the mixing chamber of the burner head 1, the mixed fuel gas with air ejected from the gas flow disturbing mixer 4 will further mix with the air within the mixing chamber of the burner head 1 along the slanted grooves 41 of the casings of the first and second mixer units 4A, 4B so as to further enhance the fuel gas-air mixing effect within the burner head 1. Having the mixing configuration of the gas flow disturbing mixer 4, the mixed fuel gas with air can be completed combusted. Therefore, the jet type gas cooker of the present invention is able to fully burn the fuel gas to save the energy. As will be readily appreciated that the jet type gas cooker of the preferred embodiment adapts two mixer units 4A, 4B for enhancing the mixing between the air and fuel gas. The gas flow disturbing mixer 4 may be formed to include three or more mixer units being disposed within the mixing chamber for further enhancing the mixing effect between the air and the fuel gas.

Figure 11:
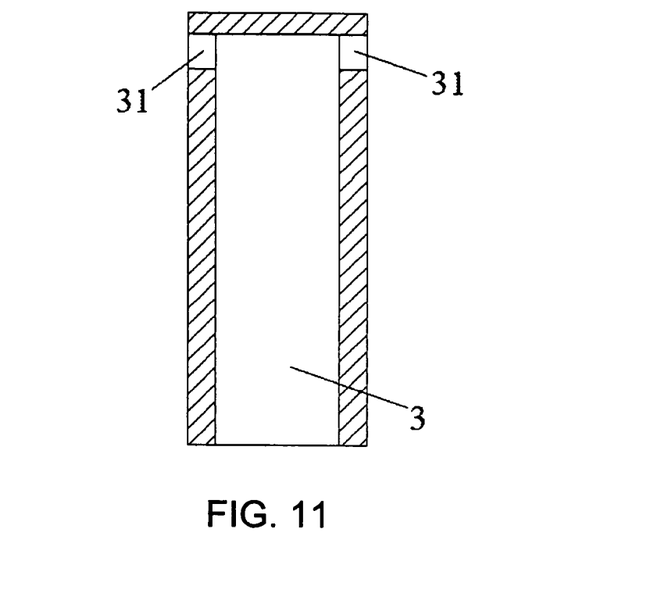
FIG. 11 is a sectional view of a depressurizing split-flow arrangement of the jet type gas cooker according to the above preferred embodiment of the present invention.

Accordingly, the jet type gas cooker of the present invention may further have variety of types of depressurizing split-flow arrangements provided at a bottom side of the burner head 1 to incorporate with the fuel gas pipe 3. There are varieties of technologies of the depressurizing split-flow arrangements. Basically the depressurizing split-flow arrangement is provided for detour the jetting direction along the fuel gas pipe 3 of the fuel gas. Therefore, the depressurizing split-flow arrangement is able to alternate the original jetting direction along the fuel gas pipe 3 of the fuel gas and to form two or more fuel gas jetting channel or pores, so that the fuel gas is able to be jetted from multiple jetting nozzles or openings into the hollow mixing pipe. Referring to FIG. 11 of the drawings, a jet type gas cooker according to the preferred embodiment of the present invention is provided, wherein the fuel gas is being conveyed by the fuel gas pipe to upwardly jet into the hollow mixing pipe, wherein the fuel gas is being split into two or more flow passages via two or more split-flow openings 31 located at the opening of the fuel gas pipe 3. The structure and appearance of the split-flow arrangement may be similar to FIG. 12 or 13. On the other hands, the pressure of the fuel gas within the fuel gas pipe 3 is able to be reduced via the split-flow arrangement; the split-flow arrangement also further enhances the mixing of the air and the fuel gas.

Figure 12:
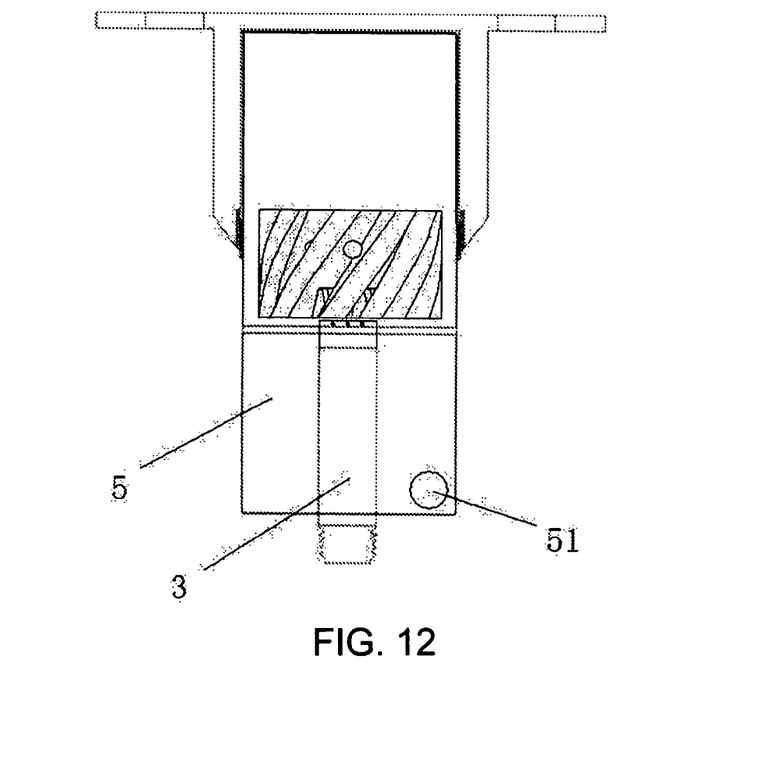
FIG. 12 is perspective of an alternative jet type gas cooker according to the above preferred embodiment of the present invention.

FIG. 12 illustrates an alternative mode of the gas cooker which further comprises an air blow housing 5 provided at the bottom side of the burner head 1. In this alternative, the fuel gas pipe 3 is extended through an air chamber of the air blow housing 5 to the bottom side of the burner head 1. In particular, the upper side of the air blow housing 5 is sealed with the bottom side of the burner head 1, wherein the grid element 11 is coupled between the upper side of the air blow housing 5 and the bottom side of the burner head 1, as shown in FIG. 2, to communicate the air chamber of the air blow housing 5 with the mixing chamber of the burner head 1. The air blow housing 5 further has at least an air inlet 51 formed at the surrounding wall of the air blow housing 5, wherein an air blower is operatively coupled with the air blow housing 5 through the air inlet 51 for blowing an air flow into the air chamber of the air blow housing 5. The air blower of the preferred embodiment preferably adapts DC or AC powered air blower or fan for generating the air flow into the air chamber of the air blow housing 5. Accordingly, the air blow housing 5 is positioned at the bottom side of the burner head 1 such that the air flow generated by the air blower is directly guided to enter into the mixing chamber of the burner head 1 through the air chamber of the air blow housing 5 so as to well-mix with the fuel gas via the gas flow disturbing mixer 4. Meanwhile, the air flow from the air blow housing 5 will substantially increase the pressure of the mixed fuel gas with air within the mixing chamber of the burner head 1 to ensure the mixed fuel gas with air being upwardly ejected at the flame controller 2. Therefore the distance between the flame of the burning fuel gas at the flame controller 2 and the bottom of the cooking utensil or appliance is substantially minimized to enhance the heat transferring efficiency from the flame to the cooking utensils. The supply of oxygen for burning fuel gas is also increased for relatively more fully burning the combustion gas as the mixed fuel gas with air.

Figure 13:
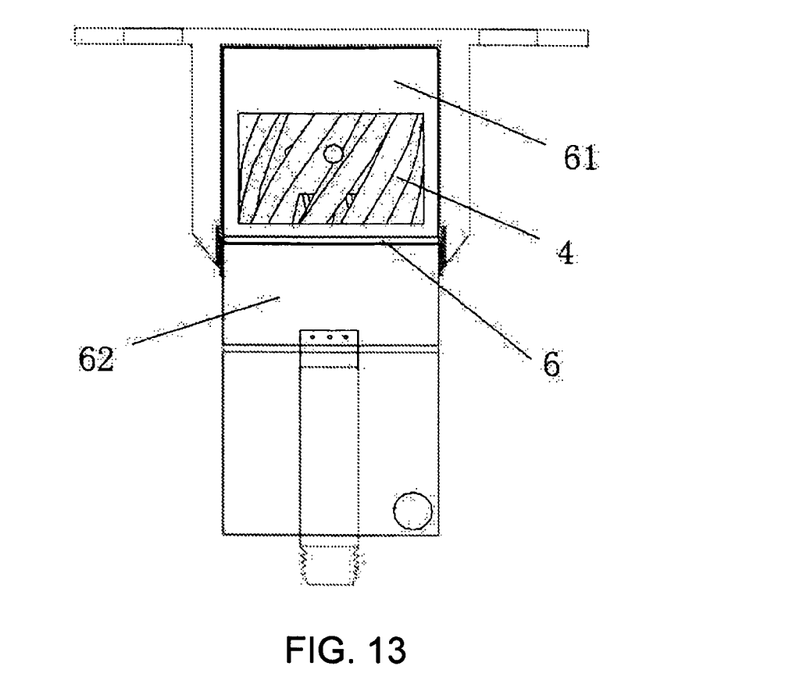
FIG. 13 is perspective of another alternative jet type gas cooker according to the above preferred embodiment of the present invention.

FIG. 13 further illustrates another alternative mode of the gas cooker which further comprises a partition element 6, having a planar structure with a plurality of meshes provided thereon, supported within the mixing chamber of the burner head 1 to define an upper first mixing room 61 and a lower second mixing room 62. The gas flow disturbing mixer 4 is supported at the first mixing room 61. Accordingly, the second mixing room 62 forms the air chamber of the air blow housing 5 for guiding the air flow thereinto, wherein the fuel gas pipe 3 is disposed at the second mixing room 62 such that the fuel gas ejected from the fuel gas pipe 3 is firstly mixed with the air within the second mixing room 62. Then, the mixed fuel gas with air within the second mixing room 62 is guided to eject into the first mixing room 62 through the meshes of the partition element 6 so as to secondly well-mix the fuel gas with air via the gas flow disturbing mixer 4 within the first mixing room 61 as it is mentioned above. It will be readily appreciated that the efficiency of mixing the air and the fuel gas through the air blow chamber and the first and second mixing rooms 61, 62 is significantly further enhanced.

Figure 14:
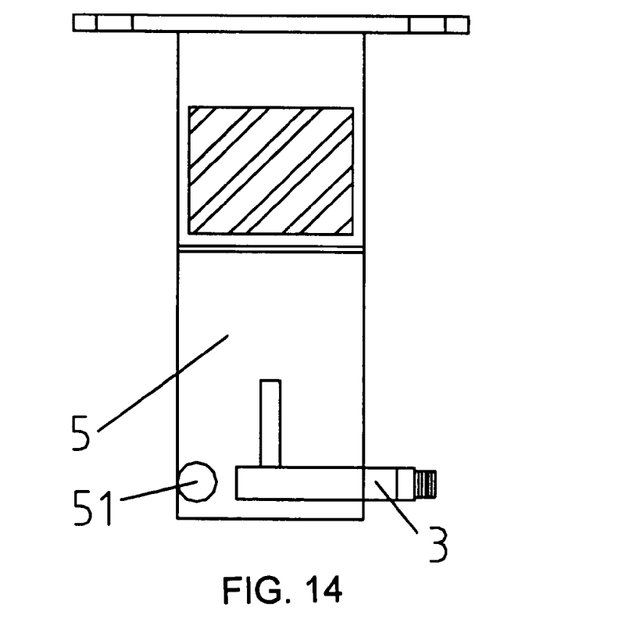
FIG. 14 is perspective of still another alternative jet type gas cooker according to the above preferred embodiment of the present invention.
Figure 15:
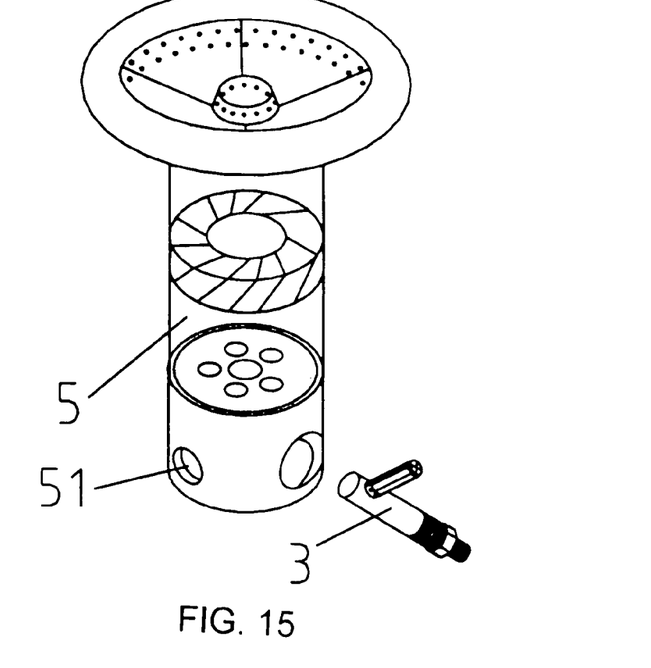
FIG. 15 is a 3-dimensional view of FIG. 14.

FIGS. 14 and 15 further illustrate another alternative mode of the gas cooker, wherein the air blow housing 5 is integrally formed at the bottom side of the burner head 1. In this alternative, the fuel gas pipe 3 is extended through an air chamber of the air blow housing 5 at the bottom side of the burner head 1. In particular, the upper side of the air blow housing 5 is sealed with the bottom side of the burner head 1, wherein the grid element 11 is coupled between the upper side of the air blow housing 5 and the bottom side of the burner head 1, as shown in FIGS. 2 and 15, to communicate the air chamber of the air blow housing 5 with the mixing chamber of the burner head 1. The air blow housing 5 further has at least an air inlet 51 formed at the surrounding wall of the air blow housing 5, wherein an air blower is operatively coupled with the air blow housing 5 through the air inlet 51 for blowing an air flow into the air chamber of the air blow housing 5. The air blower of the preferred embodiment preferably adapts DC or AC powered air blower or fan for generating the air flow into the air chamber of the air blow housing 5. Accordingly, the air blow housing 5 is positioned at the bottom side of the burner head 1 such that the air flow generated by the air blower is directly guided to enter into the mixing chamber of the burner head 1 through the air chamber of the air blow housing 5 so as to well-mix with the fuel gas via the gas flow disturbing mixer 4. Meanwhile, the air flow from the air blow housing 5 will substantially increase the pressure of the mixed fuel gas with air within the mixing chamber of the burner head 1 to ensure the mixed fuel gas with air being upwardly ejected at the flame controller 2. Therefore the distance between the flame of the burning fuel gas at the flame controller 2 and the bottom of the cooking utensil or appliance is substantially minimized to enhance the heat transferring efficiency from the flame to the cooking utensils. The supply of oxygen for burning fuel gas is also increased for relatively more fully burning the combustion gas as the mixed fuel gas with air.

Figure 16:
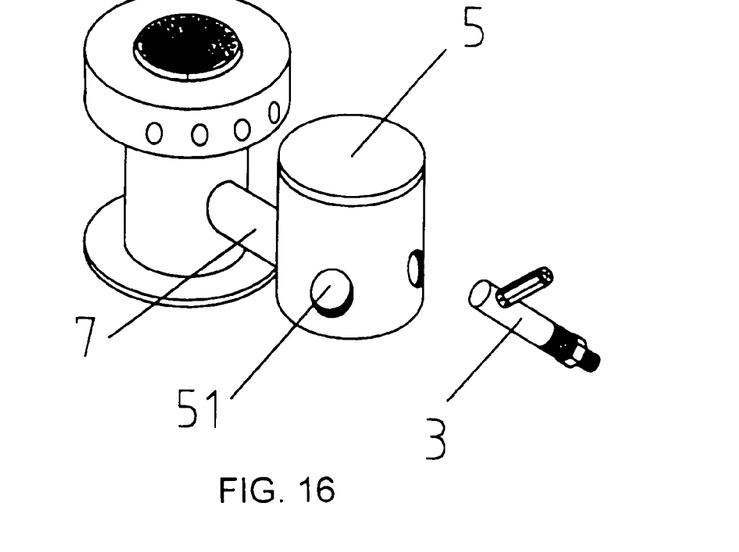
FIG. 16 is perspective of still another alternative jet type gas cooker according to the above preferred embodiment of the present invention.

FIG. 13 further illustrates another alternative mode of the gas cooker, which further comprises a partition element 6, having a planar structure with a plurality of meshes provided thereon, supported within the mixing chamber of the burner head 1 to define an upper first mixing room 61 and a lower second mixing room 62. The gas flow disturbing mixer 4 is supported at the first mixing room 61. As shown in FIG. 16, the air blow housing 5 is located adjacent to the burner head 1, wherein the air blow housing 5 further comprises a communication channel 7 extended between the air blow housing 5 and the burner head 1 to communicate the second mixing room 62 of the burner head 1 with the air chamber of the air blow housing 5 so as to guide the air flow from the air chamber of the air blow housing 5 to the second mixing room 62 of the burner head 1 through the communication channel 7. The fuel gas pipe 3 is disposed at the second mixing room 62. The air blow housing 5 further has at least an air inlet 51 formed at the surrounding wall of the air blow housing 5, wherein an air blower is operatively coupled with the air blow housing 5 through the air inlet 51 for blowing an air flow into the air chamber of the air blow housing 5. Accordingly, the fuel gas ejected from the fuel gas pipe 3 is firstly mixed with the air within the second mixing room 62. Then, the mixed fuel gas with air within the second mixing room 62 is guided to eject into the first mixing room 62 through the meshes of the partition element 6 so as to secondly well-mix the fuel gas with air via the gas flow disturbing mixer 4 within the first mixing room 61 as it is mentioned above. It will be readily appreciated that the efficiency of mixing the air and the fuel gas through the air blow chamber and the first and second mixing rooms 61, 62 is significantly further enhanced.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A gas cooker, comprising:

a burner head having a mixing chamber therewithin and a bottom side, wherein said mixing chamber of said burner head has a cylindrical shape;

an air blow housing communicating with said burner head, wherein a grid element is supported at said burner head;

a flame controller seated on top of said burner head;

a fuel gas pipe extended to said bottom side of said burner head for ejecting fuel gas into said mixing chamber; and a gas flow disturbing mixer having a corresponding cylindrical shape being fittedly disposed within said within said mixing chamber of said burner head for mixing said fuel gas with air to form a combustion gas within said mixing chamber, wherein said gas flow disturbing mixer comprises:

first and second mixer units, wherein said first and second mixer units both have cylindrical shaped casings that said casing of said first mixer unit is spacedly encircled within said casing of said second mixer unit to define a casing space between said first and second mixer units, wherein said first mixer unit has an interior cavity for mixing the fuel gas with air, such that when said fuel gas pipe injects the fuel gas into said interior cavity of said first mixer unit, the fuel gas is turbulent therewithin to initially form a mixed fuel gas with air;

a plurality of slanted grooves inclinedly extended from a bottom side of said gas flow disturbing mixer to a top side thereof in a spiral manner, wherein said slanted grooves are inclinedly extended at outer sides of said casings of said first and second mixer units;

a plurality of ejecting holes radially formed at said slanted grooves respectively, wherein said ejecting holes are radially formed at said casings of said first and second mixer units, wherein said ejecting holes are through holes and are formed at said casings of said first and second mixer units at said slanted grooves thereat, wherein due to a pressure of the fuel gas, said mixed fuel gas with air is guided to radially and outwardly eject from said interior cavity of said first mixer unit through said ejecting holes thereat towards said second mixer unit, wherein openings of said ejecting holes are formed at said slanted grooves, such that said mixed fuel gas with air is guided to upwardly flow along said slanted grooves at said casing of said first mixer unit in a spiral manner, wherein said casing of said first mixer unit is coaxially and spacedly disposed within said casing of the second mixer unit, such that said mixed fuel gas with air from said first mixer unit is secondly well-mixed within said casing space between said casings of said first and second mixer units, wherein due to a pressure of said mixed fuel gas with air within said casing space, said mixed fuel gas is then guided to radially and outwardly eject from said casing space to said outer side of said casing of said second mixer unit through said ejecting holes thereat, wherein said openings of said ejecting holes are also formed at said slanted grooves, such that said mixed fuel gas with air is guided to upwardly flow along said slanted grooves at said casing of said second mixer unit in a spiral manner, as a result, said gas flow disturbing mixer is arranged for firstly mixing the fuel gas with the air at said first mixer unit to form said mixed fuel gas with air and for secondly mixing said mixed fuel gas with air again at said second mixer unit so as to enforcedly well-premix said fuel gas with air in a turbulent manner within said mixing chamber in order to ensure said combustion gas to be fully combusted.

2. The gas cooker, as in claim 1, further comprising a depressurizing split-flow arrangement provided at said bottom side of said burner head for detour a jetting direction of the fuel gas along said fuel gas pipe, so as to reduce a pressure of said fuel gas within said fuel gas pipe for enhancing said fuel gas to mix with air.

3. The gas cooker, as in claim 1, wherein said air blow housing is provided at said bottom side of said burner head, wherein said fuel gas pipe is extended through an air chamber of said air blow housing to said bottom side of said burner head, wherein an upper side of said air blow housing is sealed with said bottom side of said burner head, wherein said grid element is provided between said upper side of said air blow housing and said bottom side of said burner head, wherein said air blow housing further has at least an air inlet formed at a surrounding wall of said air blow housing for operatively coupling with an air blower through said air inlet to blow an air flow into said air chamber of said air blow housing.

4. The gas cooker, as in claim 2, wherein said air blow housing is provided at said bottom side of said burner head, wherein said fuel gas pipe is extended through an air chamber of said air blow housing to said bottom side of said burner head, wherein an upper side of said air blow housing is sealed with said bottom side of said burner head, wherein said grid element is provided between said upper side of said air blow housing and said bottom side of said burner head, wherein said air blow housing further has at least an air inlet formed at a surrounding wall of said air blow housing for operatively coupling with an air blower through said air inlet to blow an air flow into said air chamber of said air blow housing.

5. The gas cooker, as recited in claim 3, further comprising a partition element, having a planar structure with a plurality of meshes provided thereon, supported to within said mixing chamber of said burner head to define an upper first mixing room and a lower second mixing room, wherein said gas flow disturbing mixer is supported at said first mixing room, wherein said second mixing room forms an air chamber of said air blow housing for guiding air flow thereinto, wherein said fuel gas pipe is disposed at said second mixing room.

6. The gas cooker, as recited in claim 4, further comprising a partition element, having a planar structure with a plurality of meshes provided thereon, supported to within said mixing chamber of said burner head to define an upper first mixing room and a lower second mixing room, wherein said gas flow disturbing mixer is supported at said first mixing room, wherein said second mixing room forms an air chamber of said air blow housing for guiding air flow thereinto, wherein said fuel gas pipe is disposed at said second mixing room.

7. The gas cooker, as recited in claim 1, wherein said air blow housing is integrally formed at said bottom side of said burner head, wherein said fuel gas pipe is extended through an air chamber of said air blow housing at said bottom side of said burner head, wherein an upper side of said air blow housing is sealed with said bottom side of said burner head, wherein said grid element is provided between said upper side of said air blow housing and said bottom side of said burner head, wherein said air blow housing further has at least an air inlet formed at a surrounding wall of said air blow housing for operatively coupling with an air blower through said air inlet to blow an air flow into said air chamber of said air blow housing.

8. The gas cooker, as recited in claim 2, wherein said air blow housing is integrally formed at said bottom side of said burner head, wherein said fuel gas pipe is extended through an air chamber of said air blow housing at said bottom side of said burner head, wherein an upper side of said air blow housing is sealed with said bottom side of said burner head, wherein said grid element is provided between said upper side of said air blow housing and said bottom side of said burner head, wherein said air blow housing further has at least an air inlet formed at a surrounding wall of said air blow housing for operatively coupling with an air blower through said air inlet to blow an air flow into said air chamber of said air blow housing.

9. The gas cooker, as in claim 1, further comprising a partition element, wherein said partition element, having a plurality of meshes provided thereon, supported within said mixing chamber of said burner head to define an upper first mixing room and a lower second mixing room, wherein said gas flow disturbing mixer is supported at said first mixing room, wherein said air blow housing is located adjacent to said burner head, wherein said air blow housing further comprises a communication channel extended between said air blow housing and said burner head to communicate said second mixing room of said burner head with said air chamber of said air blow housing so as to guide an air flow from said air chamber of said air blow housing to said second mixing room of said burner head through said communication channel, wherein said air blow housing further has at least an air inlet formed at a surrounding wall of said air blow housing for operatively coupling with an air blower through said air inlet to blow said air flow into said air chamber of said air blow housing.

10. The gas cooker, as in claim 2, further comprising a partition element, wherein said partition element, having a plurality of meshes provided thereon, supported within said mixing chamber of said burner head to define an upper first mixing room and a lower second mixing room, wherein said gas flow disturbing mixer is supported at said first mixing room, wherein said air blow housing is located adjacent to said burner head, wherein said air blow housing further comprises a communication channel extended between said air blow housing and said burner head to communicate said second mixing room of said burner head with said air chamber of said air blow housing so as to guide an air flow from said air chamber of said air blow housing to said second mixing room of said burner head through said communication channel, wherein said air blow housing further has at least an air inlet formed at a surrounding wall of said air blow housing for operatively coupling with an air blower through said air inlet to blow said air flow into said air chamber of said air blow housing.

* * * * *